(12) United States Patent
Gao et al.

(10) Patent No.: US 10,958,748 B2
(45) Date of Patent: Mar. 23, 2021

(54) RESOURCE PUSH METHOD AND APPARATUS

(71) Applicant: TENCENT TECHNOLOGY (SHENZHEN) COMPANY LIMITED, Shenzhen (CN)

(72) Inventors: Wenyao Gao, Shenzhen (CN); Lingling Yi, Shenzhen (CN); Peng He, Shenzhen (CN); Liwei Qiu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/531,671

(22) Filed: Aug. 5, 2019

(65) Prior Publication Data

US 2019/0364123 A1    Nov. 28, 2019

Related U.S. Application Data

(63) Continuation of application No. PCT/CN2018/082451, filed on Apr. 10, 2018.

(30) Foreign Application Priority Data

Apr. 13, 2017  (CN) .......................... 201710242368.2

(51) Int. Cl.
*H04L 29/08* (2006.01)
*G06N 20/10* (2019.01)
*G06K 9/62* (2006.01)

(52) U.S. Cl.
CPC ............ *H04L 67/26* (2013.01); *G06K 9/6201* (2013.01); *G06K 9/6269* (2013.01); *G06N 20/10* (2019.01); *H04L 67/306* (2013.01)

(58) Field of Classification Search
CPC ...................................................... H04L 67/26
See application file for complete search history.

(56) References Cited

U.S. PATENT DOCUMENTS 6,020,883 A * 2/2000 Herz ..................... H04L 9/0825
715/721
2015/0326679 A1   11/2015 Lin et al.
(Continued)

FOREIGN PATENT DOCUMENTS

CN         104038517 A      9/2014
CN         104199836 A     12/2014
(Continued)

OTHER PUBLICATIONS

The World Intellectual Property Organization (WIPO) International Search Report for PCT/CN2018/082451 dated Jul. 6, 2018 5 Pages (including translation).

(Continued)

*Primary Examiner* — Adnan M Mirza
(74) *Attorney, Agent, or Firm* — Anova Law Group, PLLC

(57) ABSTRACT

A resource-push method is disclosed. The method includes obtaining, by a resource-push server, a target relationship chain of a benchmark user; determining at least one relational user of the benchmark user according to the benchmark user and the target relationship chain; and obtaining parameter characteristics of the at least one relational user from a preset database. The method also includes determining a similarity value between each of the at least one relational user and the benchmark user according to the parameter characteristics, or a probability value of each of the at least one relational user according to the parameter characteristics; and determining at least one push user from the at least one relational user according to the similarity (Continued)

value or the probability value, so as to push a target resource to the at least one push user.

20 Claims, 10 Drawing Sheets

(56) References Cited

U.S. PATENT DOCUMENTS

| | | | |
|---|---|---|---|
| 2015/0331951 A1 | 11/2015 | Wang et al. | |
| 2016/0283843 A1 | 9/2016 | Li | |
| 2017/0118298 A1* | 4/2017 | Ji | ............... H04L 67/22 |
| 2018/0020250 A1 | 1/2018 | Shi et al. | |

FOREIGN PATENT DOCUMENTS

| | | |
|---|---|---|
| CN | 104199838 A | 12/2014 |
| CN | 104951465 A | 9/2015 |
| CN | 106326228 A | 1/2017 |
| CN | 106446100 A | 2/2017 |
| CN | 106503022 A | 3/2017 |
| CN | 107103057 A | 8/2017 |

OTHER PUBLICATIONS

The State Intellectual Property Office of the People's Republic of China (SIPO) Office Action 1 for 201710242368.2 dated Mar. 28, 2018 7 Pages (including translation).

\* cited by examiner

| Seed user upload | |
|---|---|
| Original group: | ● Upload a new user package ○ Select from existing user packages |
| User package content: | ● uin WeChat uin ○ openid |
| File upload: | ● Local file ○ TDW interface machine file upload |
| Select a file to upload: | File upload |
| Tag selection: | ☑ Unlimited ☐ Colleagues ☐ Relatives ☐ Classmates |
| Output content: | [ ] Ten thousands |
| Spread scale: | ● uin WeChat uin ○ openid |

FIG. 6

# RESOURCE PUSH METHOD AND APPARATUS

CROSS-REFERENCES TO RELATED APPLICATIONS

This application is a continuation application of PCT Patent Application No. PCT/CN2018/082451, filed on Apr. 10, 2018, which claims priority to Chinese Patent Application No. 2017102423682, titled "RESOURCE PUSH METHOD AND APPARATUS," filed on Apr. 13, 2017, all of which are incorporated by reference in entirety.

FIELD OF THE TECHNOLOGY

The present disclosure relates to the field of communications technologies, and in particular, to a resource push method and apparatus.

BACKGROUND OF THE DISCLOSURE

With the development of network technologies, social networks have become one of important communication platforms. It is well-known that performing resource push in a social network is an important resource promotion manner. However, in a conventional resource push manner, all users are usually filtered according to a preset rule, to obtain a candidate user set, then the candidate user set is sorted by a model trained by using a training set constructed by seed users and negative samples, to filter out a target advertising user group, and then one-time resource push is performed. This push manner has relatively low precision. The disclosed methods and systems are directed to solve one or more problems set forth above and other problems.

SUMMARY

Embodiments of the present disclosure provide a resource push method and apparatus. According to one aspect, an embodiment of the present disclosure provides a resource push method. The method includes obtaining, by a resource-push server, a target relationship chain of a benchmark user; determining at least one relational user of the benchmark user according to the benchmark user and the target relationship chain; and obtaining parameter characteristics of the at least one relational user from a preset database. The method also includes determining a similarity value between each of the at least one relational user and the benchmark user according to the parameter characteristics, or a probability value of each of the at least one relational user according to the parameter characteristics; and determining at least one push user from the at least one relational user according to the similarity value or the probability value, so as to push a target resource to the at least one push user.

According to another aspect, an embodiment of the present disclosure further provides a resource push apparatus. The apparatus includes a memory storing computer program instructions; and a processor coupled to the memory. When executing the computer program instructions, the processor is configured to perform: obtaining a target relationship chain of a benchmark user; determining at least one relational user of the benchmark user according to the benchmark user and the target relationship chain; obtaining parameter characteristics of the at least one relational user from a preset database; determining a similarity value between each of the at least one relational user and the benchmark user according to the parameter characteristics, or a probability value of each of the at least one relational user according to the parameter characteristics; and determining at least one push user from the at least one relational user according to the similarity value or the probability value, so as to push a target resource to the at least one push user.

According to another, an embodiment of the present disclosure further provides non-transitory computer-readable storage medium. The computer-readable storage medium stores computer program instructions executable by at least one processor to perform: obtaining a target relationship chain of a benchmark user; determining at least one relational user of the benchmark user according to the benchmark user and the target relationship chain; obtaining parameter characteristics of the at least one relational user from a preset database; determining a similarity value between each of the at least one relational user and the benchmark user according to the parameter characteristics, or a probability value of each of the at least one relational user according to the parameter characteristics; and determining at least one push user from the at least one relational user according to the similarity value or the probability value, so as to push a target resource to the at least one push user.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure more clearly, the following briefly introduces the accompanying drawings for describing the embodiments. Apparently, the accompanying drawings in the following description show merely some embodiments of the present disclosure, and a person of ordinary skill in the art may still derive other drawings from these accompanying drawings without creative efforts.

FIG. 6 is a diagram of a seed user upload interface in a resource-push method according to an embodiment of the present disclosure;

DESCRIPTION OF EMBODIMENTS

The following describes the technical solutions in the embodiments of the present disclosure with reference to the accompanying drawings. Apparently, the described embodiments are some embodiments of the present disclosure rather than all of the embodiments. Other embodiments obtained by a person of ordinary skill in the art based on the embodiments of the present disclosure without creative efforts shall fall within the protection scope of the present disclosure.

Figure 1:
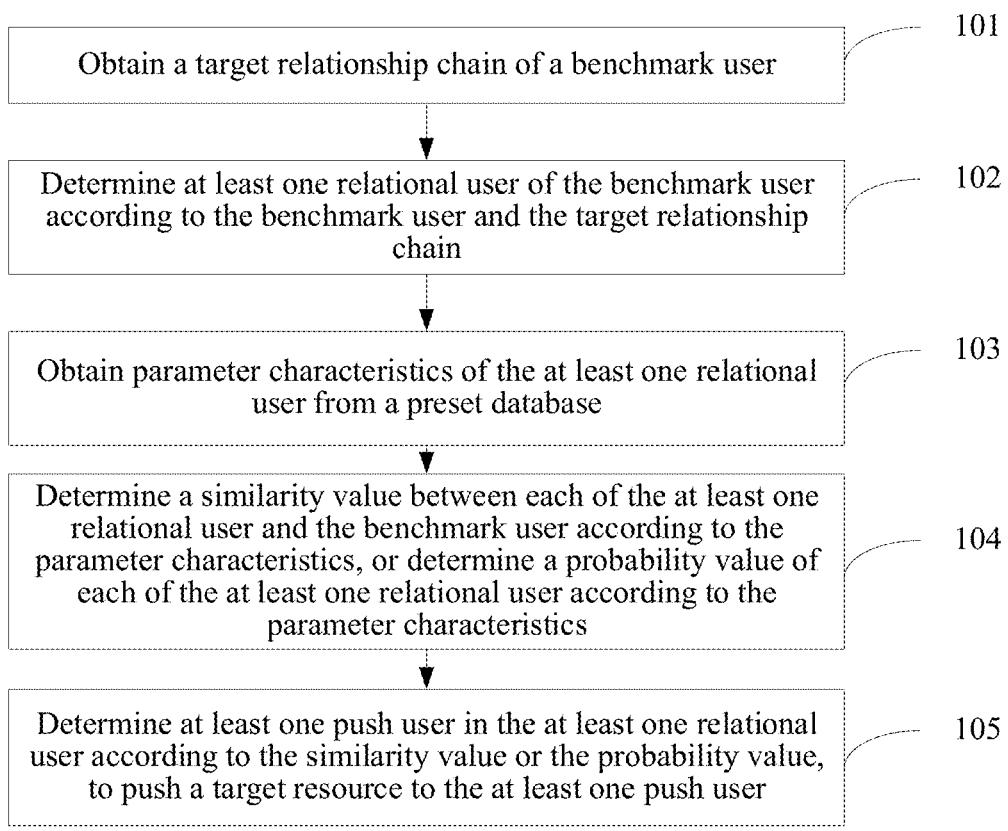
FIG. 1 is a flowchart of a resource-push method according to an embodiment of the present disclosure.

Referring to FIG. 1, an embodiment of the present disclosure provides a resource-push method, including the followings.

101. Obtaining a target relationship chain of a benchmark user.

The resource-push method provided in one embodiment of the present disclosure is mainly applied to a resource-push server, for managing push of a target resource.

A target relationship chain may be set by a user. For example, the user may set the target relationship chain by using a preset interactive interface. The target relationship chain may include all friends or some friends. For example, categories of friends include friends, relatives, classmates, colleagues, and relatives, etc. The target relationship chain includes one or more of friends, relatives, classmates, colleagues, and relatives.

In one embodiment of the present disclosure, the target resource may be pushed dynamically for a plurality of times. That is, when the target resource is pushed for the first time, the benchmark user is a seed user (namely, a user provided by a resource-push party); and subsequently each time resource-push is performed, the benchmark user is a user selected from historical push users. For example, a benchmark user corresponding to resource-push next time may be selected according to a push user to which the target resource is pushed last time. The same user can be used as the benchmark user for only once. That is, when the same target resource is pushed, each user is allowed to be used as the benchmark user for only once.

102. Determining at least one relational user of the benchmark user according to the benchmark user and the target relationship chain.

103. Obtaining parameter characteristics of the at least one relational user from a preset database.

Specific content of the parameter characteristics may be set according to an actual requirement. For example, in one embodiment, the parameter characteristics may include a user portrait feature and an embedding vector. The embedding vector is a vector mapped by a network node of a homogeneous network in which the benchmark user or the relational user is located. Optionally, to improve precision for user similarity calculation, the parameter characteristics may further include an interest tag used for reflecting a favored resource type of a user. A classification rule of the interest tag may be set according to an actual requirement. For example, layer-by-layer classification of top types and sub-types may be performed. For example, the top type of the interest tag may include a sports type, a military type, and a reading type, and the like, and the reading top type may be divided into sub-types such as a magazine type, a novel type, and a literature type. Other classification rules may also be used.

The user portrait feature, the embedding vector, and the interest tag are usually counted and stored previously. In one embodiment, stored parameter characteristics may be obtained according to the benchmark user and the target relationship chain, to obtain the parameter characteristics of the at least one relational user. Optionally, the number of the benchmark users may be set according to an actual requirement, and the number of at least one relational user corresponding to the target relationship chain of the benchmark user may be set according to an actual requirement. It should be noted that, the number of the at least one relational user corresponding to the target relationship chain of the benchmark user and an interactive behavior state with the at least one relational user may reflect social influence of the benchmark user. An interactive behavior includes two users receiving and sending messages, liking and commenting, video calling, and/or voice calling on a social platform.

104. Determining a similarity value between each of the at least one relational user and the benchmark user according to the parameter characteristics, or determine a probability value of each of the at least one relational user according to the parameter characteristics.

The parameter characteristics may be calculated and analyzed according to a preset similarity model or a probability analysis model, to obtain a similarity value between each relational user and the benchmark user, or a probability value of each of the at least one relational user is determined according to the parameter characteristics.

105. Determining at least one push user in the at least one relational user according to the similarity value or the probability value, to push a target resource to the at least one push user.

The at least one relational user may be sorted according to the similarity between each of the at least one relational user and the benchmark user or the probability value of each of the at least one relational user, and then at least one push user to which a resource is pushed this time is determined according to a sorting sequence. The manner for determining the at least one push user may be set according to an actual requirement. For example, the at least one relational user of the benchmark user may be sorted, and relational users whose similarity value or probability value with the benchmark user ranks within the top N places are selected as push users to which the resource is pushed this time, that is, relational users whose similarity value or probability value with the benchmark user ranks within the top N places are selected from the at least one relational user corresponding to the benchmark user. Alternatively, overall arrangement may be performed on similarity values between all of the at least one relational user and the benchmark user or probability values of the at least one relational user, and relational users whose similarity value or probability value ranks within the top M places are selected as push users to which the resource is pushed this time, that is, relational users whose similarity value or probability value ranks within the top M places are selected from all relational users.

It should be understood that, in a sorting process, other weight factors may further be added. For example, a corresponding activation weight factor and an emotion detection weight factor may be set respectively according to activation of a user in a circle of friends within 24 hours and an emotion state of the user within 1 hour. Each of the at least one relational user is sorted according to a product of the similarity value or the probability value and a corresponding weight factor.

After the at least one push user is determined, the target resource may be pushed to the at least one push user. Specifically, the manner for pushing the target resource may be set according to an actual requirement. More detailed descriptions are set forth in the followings.

In this way, in one embodiment of the present disclosure, a target relationship chain of a benchmark user is obtained; at least one relational user of the benchmark user is determined according to the benchmark user and the target relationship chain; parameter characteristics of the relational user are obtained from a preset database; a similarity value between the at least one relational user and the benchmark user is determined according to the parameter characteristics, or a probability value of the at least one relational user is determined according to the parameter characteristics; and at least one push user is determined from the at least one relational user according to the similarity value or the probability value, to push a target resource to the at least one push user. In one embodiment of the present disclosure, the at least one relational user of the benchmark user is used as a candidate user set, and then, the at least one push user is selected from the candidate user set, thereby effectively using social homogeneity (similarity) of a user group and social influence of the user group. Therefore, precision for resource-push is improved, thereby improving an effect of the resource-push of the server.

Figure 2:
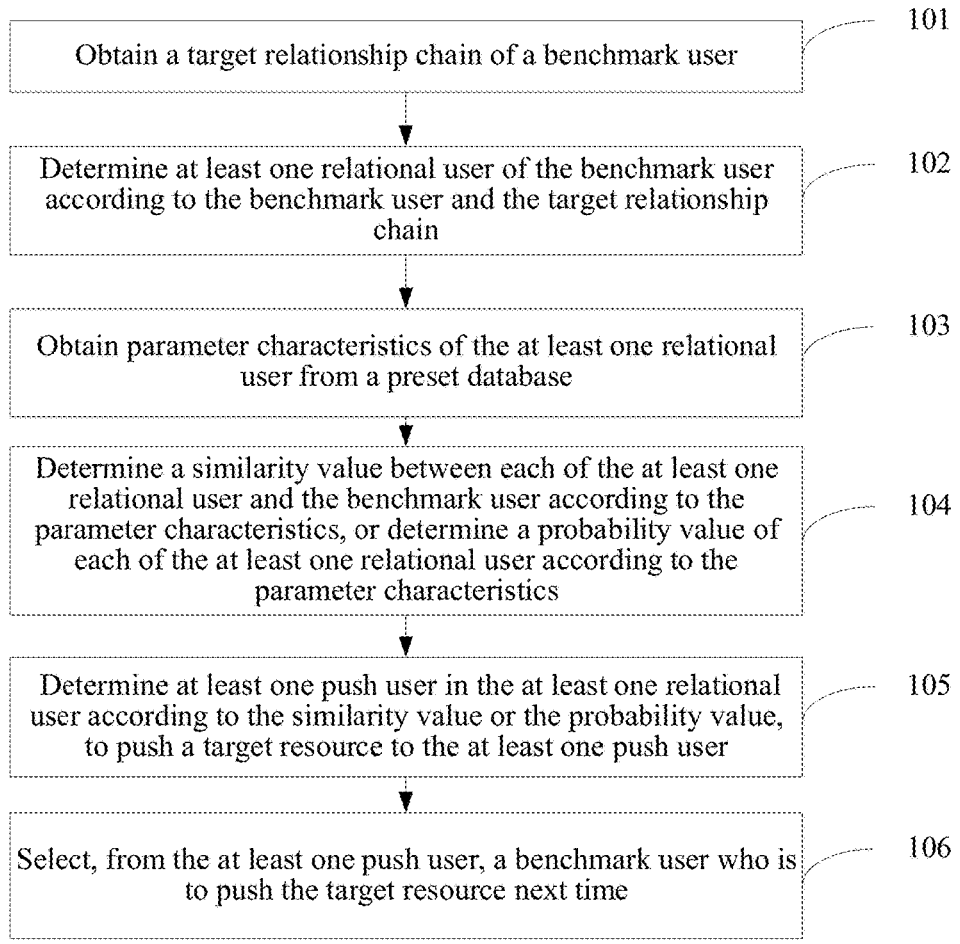
FIG. 2 is a flowchart of a resource-push method according to another embodiment of the present disclosure.

Optionally, referring to FIG. 2, after the foregoing 105, the method further includes the followings.

106. Selecting, from the at least one push user, a benchmark user for resource-push of the target resource next time.

That is, resource-push is performed on a preset network platform according to the selected at least one push user, and a benchmark user who is used to push the target resource next time is selected from the at least one push user to which the resource is pushed this time.

It may be understood that, the manner for selecting the benchmark user from push users to which the resource is pushed this time may be set according to an actual requirement. For example, a positive feedback user in the push users may be set as a benchmark user who is to push the target resource next time, or some users may be selected from positive feedback users as benchmark users. The positive feedback user may be a user that clicks and obtains a push resource, or may be a user that interacts with a server corresponding to a push resource, for example, a user that registers on the server.

In one embodiment, the positive feedback users may further be filtered according to social influence of the positive feedback users, and a user with large social influence is used as a new benchmark user.

In one embodiment, a corresponding benchmark user to which the resource is pushed next time is selected according to a push user to which the target resource is pushed last time, to further improve precision of resource-push.

Optionally, the manner for calculating the similarity value between each of the at least one relational user and the benchmark user and the probability value may be set according to an actual requirement. The following provides detailed description.

In an embodiment, the foregoing 104 includes: inputting the parameter characteristics to a logistic regression (LR)/support vector machine (SVM) model, and predicting the probability value of each of the at least one relational user, where the LR/SVM model is trained according to a gradient boosting decision tree (GBDT) leaf node sequence and the embedding vector, and the GBDT leaf node sequence is obtained by inputting a preset sample training set to the GBDT model for conversion.

Figure 3:
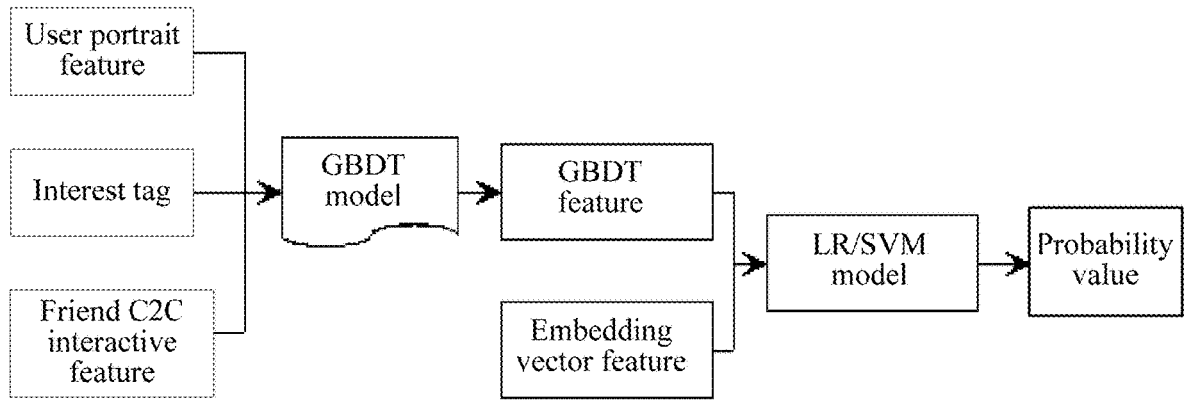
FIG. 3 is a flowchart of predicting a probability value in a resource-push method according to an embodiment of the present disclosure.

In one embodiment, a probability of each of at least one relational user for a common click is predicted by a supervised similarity model. Optionally, 20 millions of samples with a high friend common click rate may be extracted as positive samples of a training set, 20 millions of samples with a low friend common click rate may be extracted as negative samples of the training set, and then, parameter characteristic consistent with parameter characteristic types included in parameter characteristics from positive samples and negative samples are trained to obtain a GBDT model. The GBDT model may comprehensively consider a user portrait feature, an interest tag, a friend interactive behavior characteristic, and the like. As shown in FIG. 3, the GBDT model may be trained according to a user portrait feature, an interest tag, and a friend interactive behavior feature in a sample training set, and next, the trained model is used to predict a GBDT feature of all data in the sample training set, namely, a GBDT leaf node sequence obtained after sample conversion. Next, an LR/SVM model is trained according to the GBDT leaf node leaf sequence and the embedding vector, and a probability value of each of the at least one relational user, namely, a friend common click probability, is predicted.

It should be understood that, when types of input parameter characteristics are different, each time push users are to be determined, the GBDT model and the LR/SVM model need to be trained. When fixed parameter characteristics are used, the GBDT model and the LR/SVM model may be trained in advance for only once. The GBDT model and the LR/SVM model may also be updated periodically, to improve accuracy.

Figure 4:
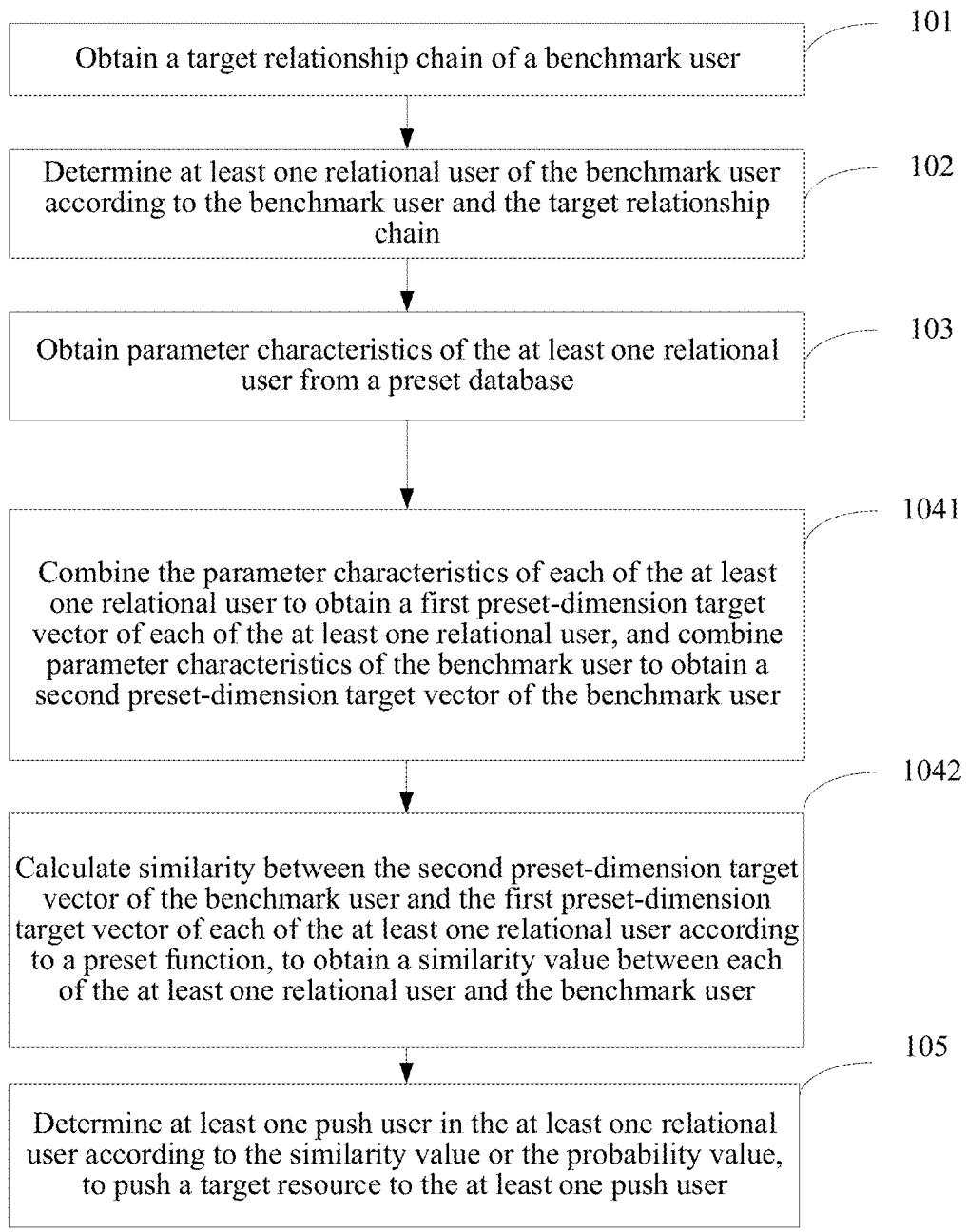
FIG. 4 is a flowchart of a resource-push method according to another embodiment of the present disclosure.

Optionally, referring to FIG. 4, in another embodiment, the foregoing Step 104 includes the followings.

1041. Combining the parameter characteristics of each of the at least one relational user to obtain a first preset-dimension target vector of each of the at least one relational user, and combining the parameter characteristics of the benchmark user to obtain a second preset-dimension target vector of the benchmark user.

1042. Calculating the similarity between the second preset-dimension target vector of the benchmark user and the first preset-dimension target vector of each of the at least one relational user according to a preset function, to obtain the similarity value between each of the at least one relational user and the benchmark user.

In one embodiment, the parameter characteristics of the benchmark user and the parameter characteristics of each of the at least one relational user are consistent, and are stored in the preset database. When the parameter characteristics of the at least one relational user are extracted, the parameter characteristics of the benchmark user may be extracted. Combining the parameter characteristics means combining a plurality of parameter characteristics to obtain a multi-dimensional vector. For example, a 50-dimensional vector and a 50-dimensional parameter characteristic may be combined to obtain a 100-dimensional vector. It is assumed that a second preset-dimension target vector of a benchmark user a is represented as $U_a$, and $U_a=\{u_i\}$, where $i=1, 2, \ldots, n$, and a first preset-dimension target vector of a relational user b is represented as $U_b$, and $U_b=\{u_i\}$, where $i=1, 2, \ldots, m$. Then, a function $sim(U_a, U_b)$ is used for measuring a similarity value between the user a and the user b. Specifically, $sim(U_a, U_b)$ may be any one of a Pearson correlation coefficient, cosine similarity, Jaccard similarity, and a Euclidean distance.

Figure 5:
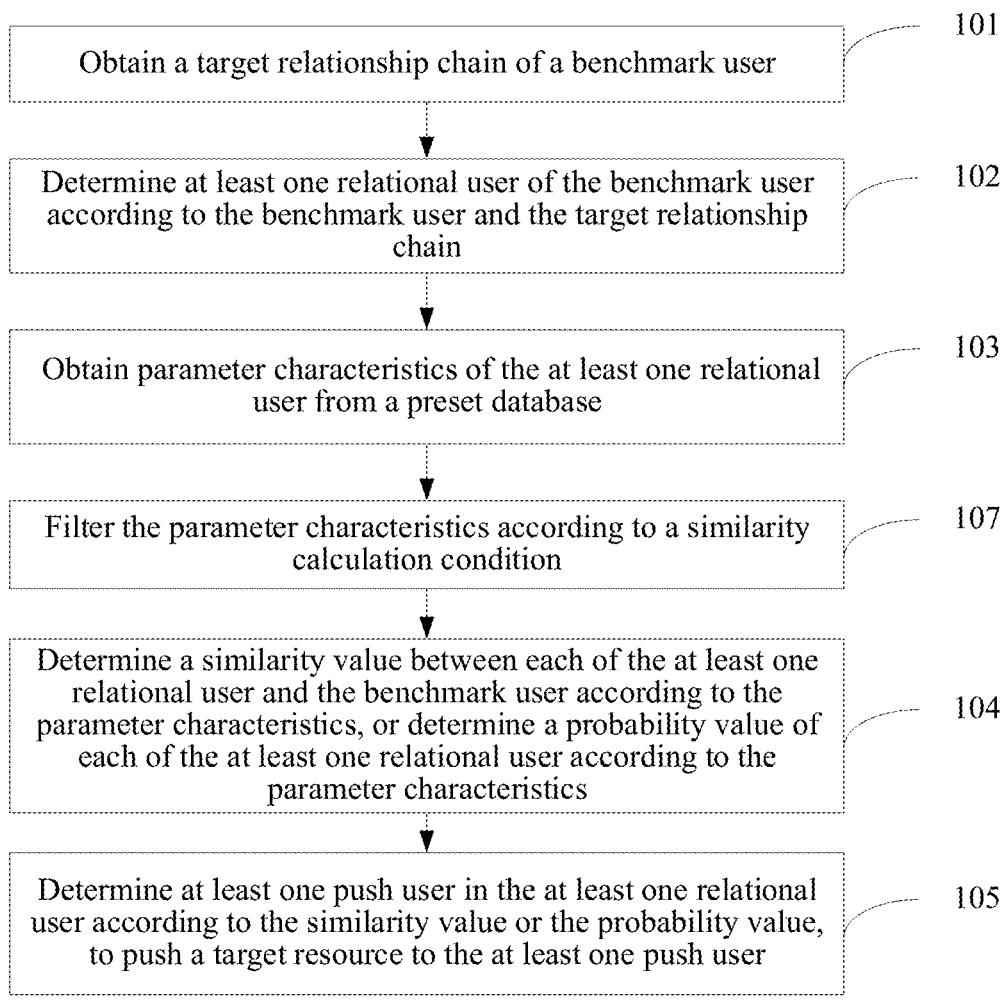
FIG. 5 is a flowchart of a resource-push method according to another embodiment of the present disclosure.

Optionally, referring to FIG. 5, before the foregoing Step 104, the method further includes the followings.

107. Filtering the parameter characteristics according to a similarity calculation condition.

The foregoing Step 104 specifically includes: determining the similarity value between each of the at least one relational user and a benchmark user according to the filtered parameter characteristics, or determining the probability value of each of the at least one relational user according to the filtered parameter characteristics.

In one embodiment, a selection button of a similarity calculation condition may be provided for a user to input. The obtained parameter characteristics are filtered based on the similarity calculation condition input by the user. Then, the filtered parameter characteristics are input in a subsequent similarity model to calculate the similarity value or predict the probability value.

The similarity calculation condition may include, but not limited to, the following three types: comprehensive similarity, interest similarity, and friend mutual influence. The obtained parameter characteristics may be filtered according to different similarity calculation conditions selected by the user. For example, if the comprehensive similarity is selected, filtering may not be performed; if the interest similarity is selected, filtering may be performed to remove some characteristics or features in the embedding vector, and if the friend mutual influence is selected, filtering may be performed to remove the interest tag and the like. Specifically, a filtering principle and a filtering example are not described in detail herein. Because the filtering for the parameter characteristic is added, pertinence for resource-push may be improved, and a click rate of the user for resources may be improved.

It may be understood that, content of the target resource-push may be set according to an actual requirement. The following provides detailed description by using advertisement resource-push as an example.

Specifically, referring to FIG. 6, advertisers may select needed seed users in a seed user upload interface of an advertising interface, for example, upload new seed users and/or select seed users from existing user packages. The user package content can be set as from a specific account, such as a WeChat account, or from an open id as all accounts of or inputted by the user. If uploading new seed users is used, a corresponding operation button is displayed for the user to upload the seed users. Meanwhile, a relationship chain tag is further set for the user to select a target relationship chain that needs to be expanded. The relationship chain tag selection includes four option buttons: unlimited, colleagues, relatives, and classmates, which specifies unlimited relationship, colleague relationship only, relative relationship only, and classmate relationship only, etc. In addition, a spread scale is further set, for the user to select a user amount for advertisement resource spread. The user amount may be one spread amount of advertisement resources, or may be a total spread amount of advertisement resources. After setting a corresponding condition, the user may click a spread starting button. In this case, the condition set by and the seed user uploaded by the user in the seed user upload interface are sent to a backend system, and the backend system determines an advertisement resource user.

Figure 7:
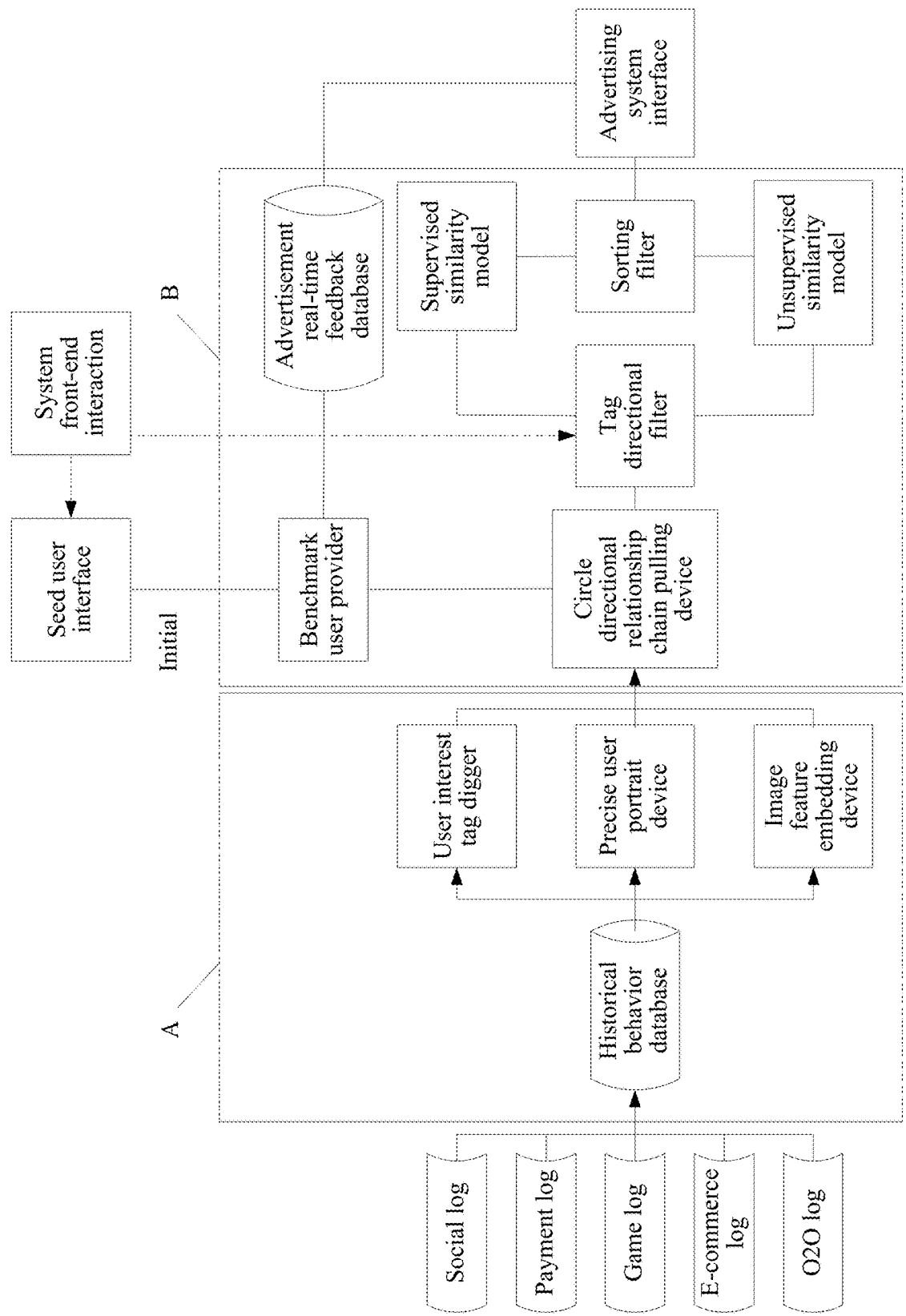
FIG. 7 is a system architecture diagram of an application of a resource-push method according to an embodiment of the present disclosure.

Further, referring to FIG. 7, the backend system includes an offline calculation part A and a real-time calculation part B.

Figure 8:
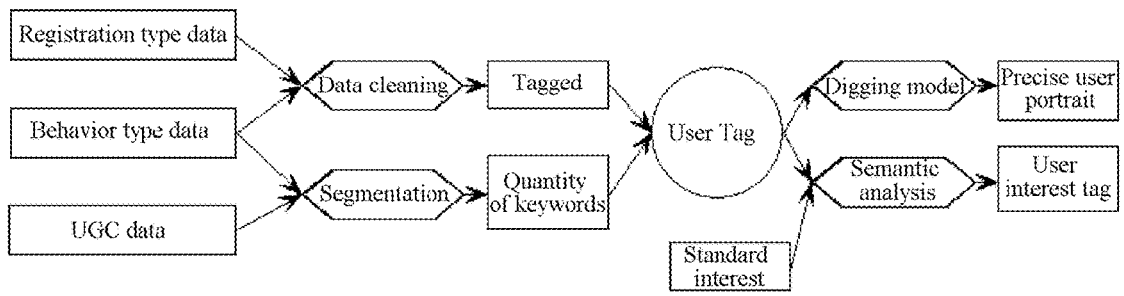
FIG. 8 is a flowchart of analyzing a user portrait feature and an interest tag in a resource-push method according to an embodiment of the present disclosure.
Figure 9:
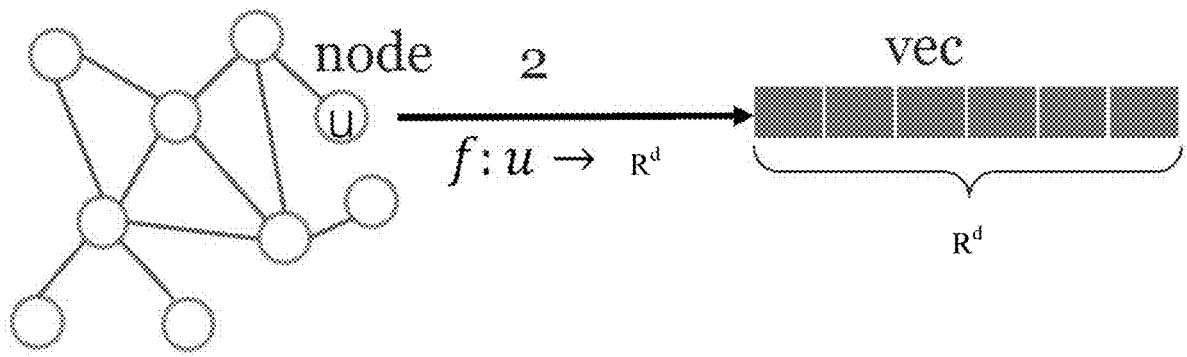
FIG. 9 is a visual diagram of a combined vector in a resource-push method according to an embodiment of the present disclosure.

The offline calculation part A has a user historical behavior database, a user interest tag digger, a precise user portrait device, and an image feature embedding device. The user historical behavior database may pull a basic log to obtain a user historical behavior. The basic log may include: a social log, a payment log, a game log, an e-commerce log, an online To offline (O2O) log, or the like. As shown in FIG. 8, then, the user interest tag digger and the precise user portrait device perform cleaning processing on user registration data, behavior data, user generated content (UGC) data, and the like, and obtain a user precise interest tag and an all-around user portrait feature by using a digging model and a semantic analysis technology. The image feature embedding device extracts a homogeneous network of the user, and maps a node in the homogeneous network (namely, the user is located at a node in the homogeneous network) to a vector in a space by using a network embedding technology. Network embedding is a learning algorithm expressed by an image feature. That is, a vector vec of a d-dimensional vector space $R^d$ is obtained by using a mapping method f, and a vector in the space is used to express a node u in a network, specifically as shown in a visual diagram in FIG. 9. In the image feature embedding device, Deepwalk (the Deepwalk refers to a method represented by a latent vector of a training network node) and Node2vec (namely, vectorization of a network node) technologies are used to analyze homogeneous networks of users on a WeChat platform, namely, a common friend network, a common followed official amount network, a common reading official amount article network, and an interactive behavior network, to obtain description vectors of these network nodes in a low-dimensional space, namely, the foregoing embedding vectors.

The real-time calculation part B includes a circle directional relationship chain pulling device, a benchmark user provider, a tag directional filter, a supervised similarity model, an unsupervised similarity model, a sorting filter, and an advertisement real-time feedback database. When advertisement resource-push is performed for the first time, the benchmark user provider may obtain a seed user and a relationship chain tag set on a seed user upload interface of advertisers on a system front-end interaction, and then output the seed user and the relationship chain tag to the circle directional relationship chain pulling device. The circle directional relationship chain pulling device pulls parameter characteristics of the relational user and the benchmark user from the user interest tag finder, precision user portrait device and the image feature embedding device according to the seed user and the relationship chain tag set on the seed user upload interface of the advertisers on the system front-end interaction. The circle directional relationship chain pulling device outputs the pulled parameter characteristics to the tag directional filter to perform preset feature filtering, and then, outputs filtered parameter characteristics to the supervised similarity model to perform common click probability prediction or output filtered parameter characteristics to the unsupervised similarity model to perform similarity value calculation. The sorting filter performs sorting on each relational user, and then, push users to which advertisement resources are pushed are determined. When advertisement resource-push is performed for the first time, advertisement resource-push also needs to be performed for seed users. Therefore, the seed users are also included in the push users. During subsequent push, the sorting filter may filter out relational users to which the advertisement resources are pushed, and then, perform sorting to determine push users (i.e., the users to be pushed with the advertisement resources).

After determining the push users, the sorting filter sends the push users to an advertising system through an advertising system interface, and the advertising system performs advertisement resource push. The advertisement real-time feedback database may obtain feedback of each push user in real time, and when advertisement resource push is performed next time, the benchmark user provider may obtain advertisement resource positive feedback users in the advertisement real-time feedback database, and then, re-determine benchmark users to perform advertisement resource push.

For example, if a push amount of advertisement resources is 5 million, advertisement resource push may be performed in five times. Because a dynamic advertising policy is introduced in the present disclosure based on a social reinforcement effect of social influence, a click volume and an interaction rate can be significantly increased to improve an effect of advertisement resource push.

Figure 10:
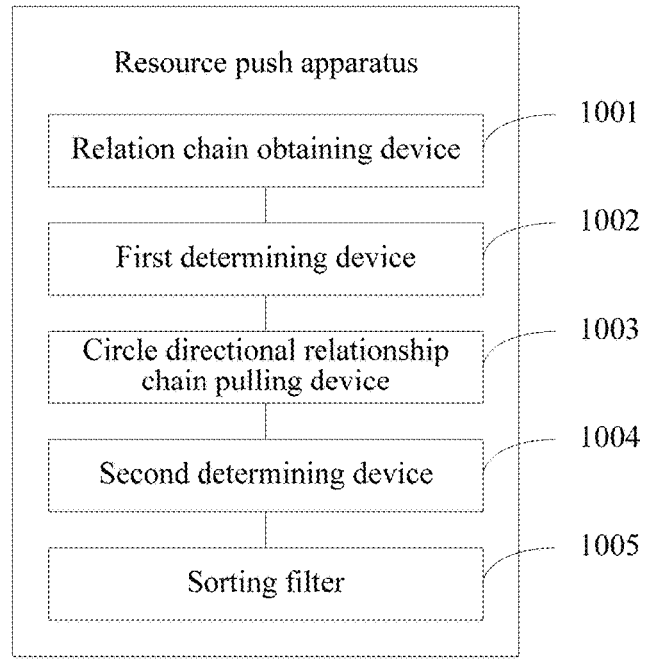
FIG. 10 is a structural diagram of a resource-push apparatus according to an embodiment of the present disclosure.

Referring to FIG. 10, the present disclosure further provides a resource-push apparatus. The resource-push apparatus includes: a relationship chain obtaining device 1001, a first determining device 1002, a circle directional relationship chain pulling device 1003, a second determining device 1004, and a sorting filter 1005, etc.

The relationship chain obtaining device 1001 is configured to obtain a target relationship chain of a benchmark user. The first determining device 1002 is configured to determine at least one relational user of the benchmark user according to the benchmark user and the target relationship chain. The circle directional relationship chain pulling device 1003 is configured to obtain parameter characteristics of the at least one relational user from a preset database.

The second determining device 1004 is configured to determine a similarity value between the at least one relational user and the benchmark user according to the parameter characteristics, or determine a probability value of each of the at least one relational user according to the parameter characteristics. The sorting filter 1005 is configured to determine at least one push user in the at least one relational user according to the similarity value or the probability value, to push a target resource to the at least one push user.

Figure 11:
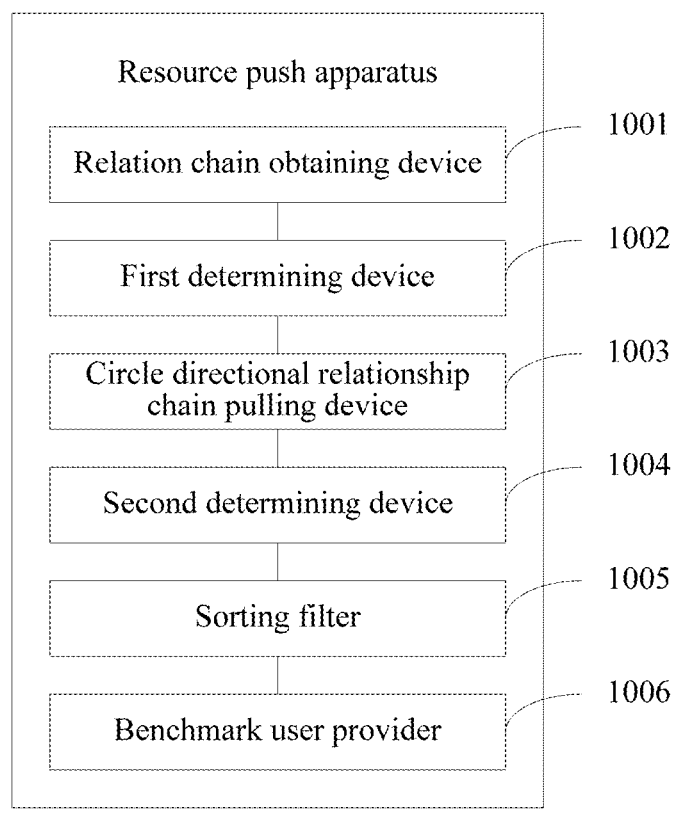
FIG. 11 is a structural diagram of a resource-push apparatus according to another embodiment of the present disclosure.

Optionally, referring to FIG. 11, the apparatus further includes: a benchmark user provider 1006, configured to select, from the at least one push user, at least one benchmark user who is to push the target resource next time.

Optionally, the benchmark user provider is specifically configured to set a positive feedback user in the at least one push user as the benchmark user who is to push the target resource next time.

Optionally, the parameter characteristic includes a user portrait feature and an embedding vector. The embedding vector is a vector mapped by a network node of a homogeneous network in which a benchmark user or a relational user is located.

Optionally, the second determining device 1004 is specifically configured to: input the parameter characteristics to an LR/SVM model, and predict the probability value of each of the at least one relational user, where the LR/SVM model is trained according to a GBDT leaf node sequence and the embedding vector, and the GBDT leaf node sequence is obtained by inputting a preset sample training set to the GBDT model for conversion.

Figure 12:
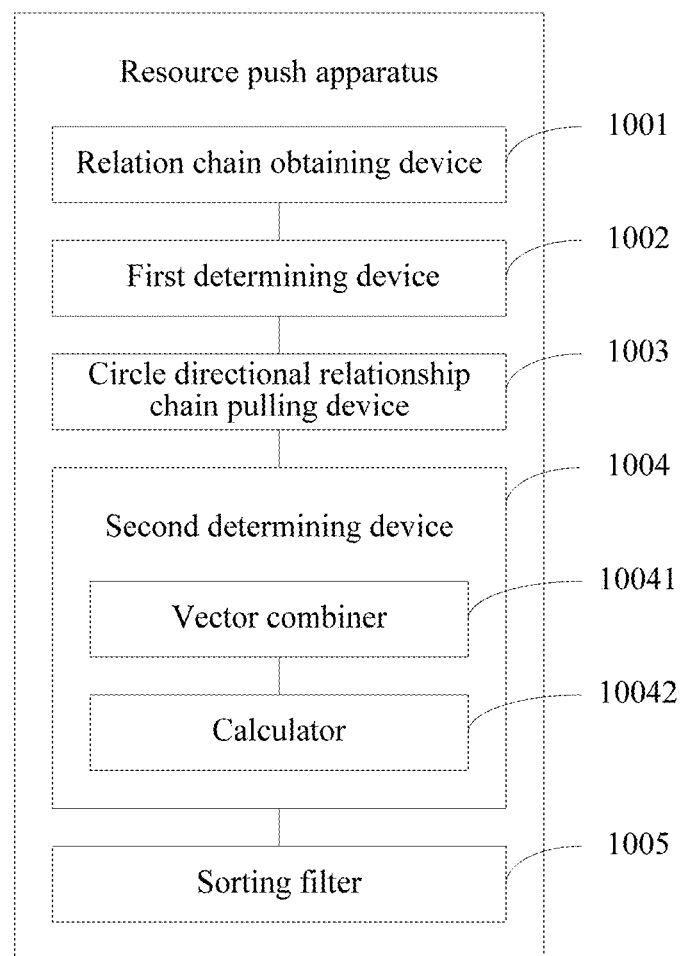
FIG. 12 is a structural diagram of a resource-push apparatus according to another embodiment of the present disclosure.

Optionally, referring to FIG. 12, the second determining device 1004 includes a vector combiner 10041 and a calculator 10042, etc.

The vector combiner 10041 is configured to combine the parameter characteristics to obtain a first preset-dimension target vector of each of the at least one relational user, and combine parameter characteristics of the benchmark user to obtain a second preset-dimension target vector of the benchmark user.

The calculator 10042 is configured to calculate similarity between the second preset-dimension target vector of the benchmark user and the first preset-dimension target vector of each of the at least one relational user according to a preset function, to obtain the similarity value between each of the at least one relational user and the benchmark user.

Optionally, the preset function includes any one of a Pearson correlation coefficient, cosine similarity, Jaccard similarity, and a Euclidean distance.

Optionally, the parameter characteristics further include an interest tag used for reflecting a favored resource type of a user.

Figure 13:
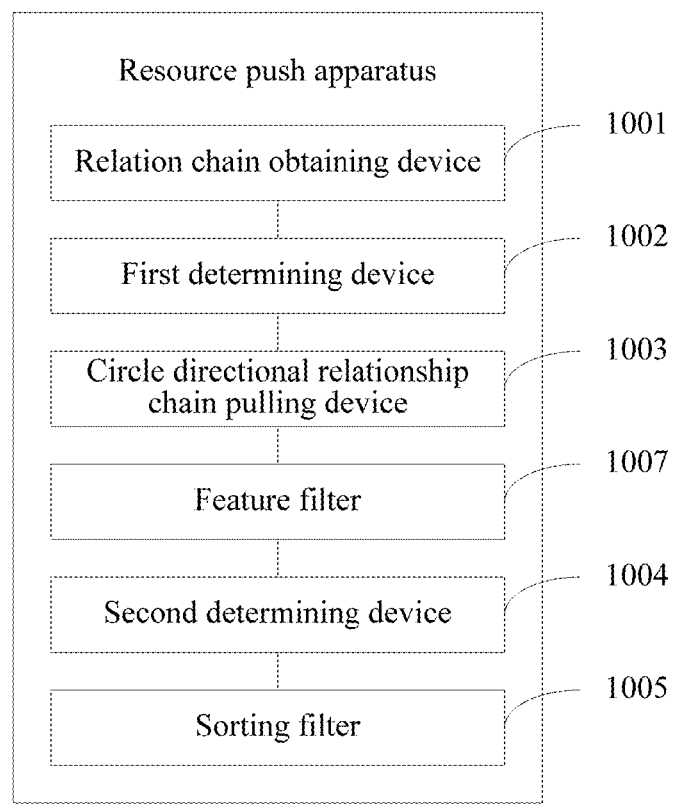
FIG. 13 is a structural diagram of a resource-push apparatus according to another embodiment of the present disclosure.

Optionally, referring to FIG. 13, the apparatus further includes a feature filter 1007, which is configured to filter the parameter characteristics according to a similarity calculation condition, to obtain filtered parameter characteristics.

The second determining device 1004 is specifically configured to: determine the similarity value between the at least one relational user and the benchmark user according to the filtered parameter characteristics, or determine the probability value of each of the at least one relational user according to the filtered parameter characteristics.

In this way, in one embodiment of the present disclosure, a target relationship chain of a benchmark user is obtained; at least one relational user of the benchmark user is determined according to the benchmark user and the target relationship chain; parameter characteristics of the at least one relational user are obtained from a preset database; a similarity value between the at least one relational user and the benchmark user is determined according to the parameter characteristics, or a probability value of each of the at least one relational user is determined according to the parameter characteristics; and at least one push user is determined from the at least one relational user according to the similarity value or the probability value, to push a target resource to the at least one push user. In one embodiment of the present disclosure, the at least one relational user of the benchmark user is used as a candidate user set, and then, the at least one push user is selected from the candidate user set, thereby effectively using social homogeneity (similarity) of a user group and social influence of the user group. Therefore, precision for resource push is improved, thereby improving an effect of the resource push.

Figure 14:
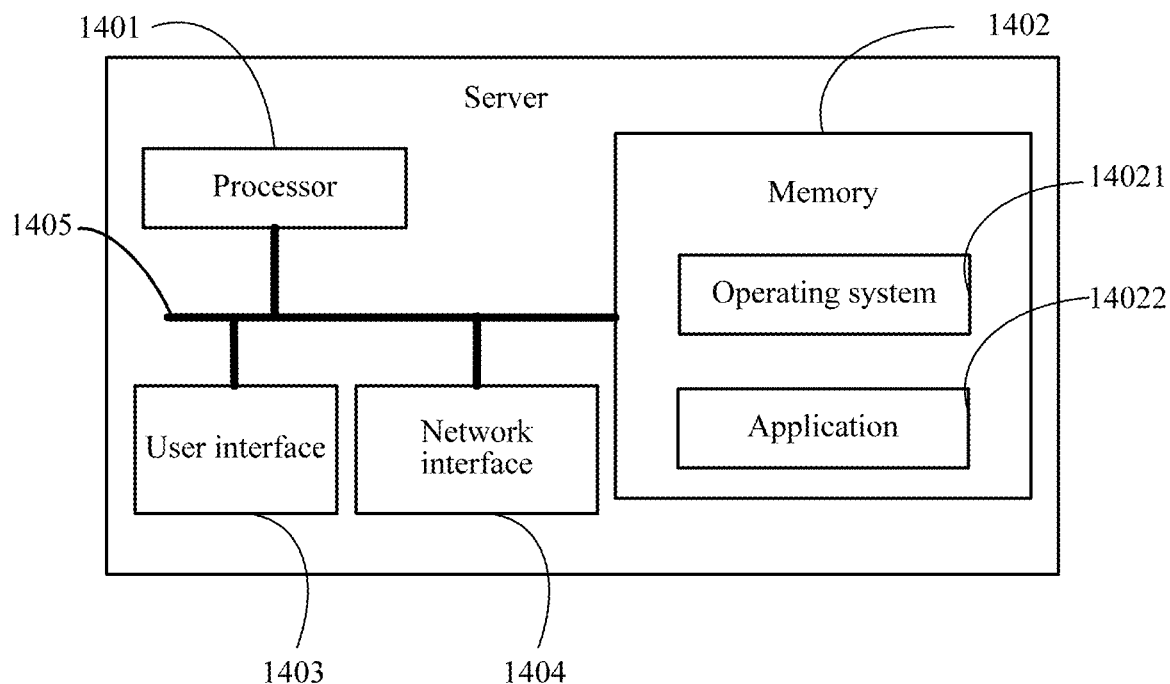
FIG. 14 is a structural diagram of a server according to an embodiment of the present disclosure.

Referring to FIG. 14, FIG. 14 is a structural diagram of a server according to an embodiment of the present disclosure. The server shown in FIG. 14 includes: at least one processor 1401, a memory 1402, at least one network interface 1404, and a user interface 1403. The components in the server are coupled by using a bus system 1405. It may be understood that, the bus system 1405 is configured to implement connection and communication between the components. In addition to a data bus, the bus system 1405 further includes a power bus, a control bus, and a state signal bus. But, for ease of clear description, all types of buses in FIG. 14 are marked as the bus system 1405.

The user interface 1403 may include a display, a keyboard or a clicking device (for example, a mouse), a track ball, a touch panel or a touchscreen, and the like.

It may be understood that, the memory 1402 in one embodiment of the present disclosure may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) serving as an external cache. Through illustrative but not limited description, RAMs in many forms, for example, a static RAM (SRAM), a Dynamic RAM (DRAM), a synchronous DRAM (SDRAM), a double data rate SDRAM (DDRSDRAM), an enhanced SDRAM (ESDRAM), a synch link DRAM (SLDRAM), and a direct rambus RAM (DRRAM), are available. The memory 1402 in the system and method described in this specification includes, but is not limited to these memories and any other suitable types.

In some implementations, the memory 1402 stores the following element, executable module, or data structure, or a subset thereof, or an extension set thereof: an operating system 14021 and an application 14022.

The operating system 14021 includes various system programs, for example, a frame layer, a core library layer, and a drive layer, used for implementing various basic services and processing tasks based on hardware. The application 14022 includes various applications, for example, a media player and a browser, used for implementing various application services. A program for implementing the method of the embodiments of the present disclosure may be included in the application 14022.

In one embodiment of the present disclosure, by invoking a program or an instruction stored in the memory 1402, specifically, a program or an instruction stored in the application 14022, the processor 1401 is configured to: obtain a target relationship chain of a benchmark user; determine at least one relational user of the benchmark user according to the benchmark user and target relationship chain; obtain parameter characteristics of the at least one relational user from a preset database; determine a similarity value between each of the at least one relational user and the benchmark user according to the parameter characteristics, or determine a probability value of each of the at least one relational user according to the parameter characteristics; and determine at least one push user in the at least one relational user according to the similarity value or the probability value, to push a target resource to the at least one push user.

Optionally, the processor 1401 is further configured to select, from the at least one push user, a benchmark user who is to push the target resource next time.

Optionally, the processor 1401 is further configured to set a positive feedback user in the at least one push user as the benchmark user who is to push the target resource next time.

Optionally, the parameter characteristic includes a user portrait feature and an embedding vector. The embedding vector is a vector mapped by a network node of a homogeneous network in which a benchmark user or a relational user is located.

Optionally, the processor 1401 is further configured to: input the parameter characteristic to an LR/SVM model, and predict the probability value of each of the at least one relational user, where the LR/SVM model is trained according to a GBDT leaf node sequence and the embedding vector, and the GBDT leaf node sequence is obtained by inputting a preset sample training set to the GBDT model for conversion.

Optionally, the target user further includes a benchmark user. The processor 1401 is further configured to: combine the parameter characteristics of each of the at least one relational user to obtain a first preset-dimension target vector of each of the at least one relational user, and combine the parameter characteristics of the benchmark user to obtain a second preset-dimension target vector of each of the at least one benchmark user; and calculate similarity between the second preset-dimension target vector of the benchmark user and the first preset-dimension target vector of each of the at least one relational user according to a preset function, to obtain the similarity value between each of the at least one relational user and the benchmark user.

Optionally, the preset function includes any one of a Pearson correlation coefficient, cosine similarity, Jaccard similarity, and a Euclidean distance.

Optionally, the parameter characteristic further includes an interest tag used for reflecting a favored resource type of a benchmark user or a relational user.

Optionally, the processor 1401 is further configured to filter features in the parameter characteristics according to a similarity calculation condition.

An embodiment of the present disclosure further provides a computer readable storage medium on which a computer program is stored, and the computer program, when executed by a processor, implements the steps in the resource-push method according to the foregoing method embodiment.

An embodiment of the present disclosure further provides a computer program product on which a computer program is stored, and the computer program, when executed by a processor, implements the steps in the resource-push method according to the foregoing method embodiment.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art can use different methods to implement the described functions for each particular application, but it should not be considered that the implementation goes beyond the scope of the embodiments of the present disclosure.

A person skilled in the art may clearly understand that, for simple and clear description, for specific work processes of the foregoing described system, apparatus, and unit, reference may be made to corresponding process in the foregoing method embodiments, and details are not described herein again.

In the embodiments provided in the present application, it should be understood that the disclosed apparatus and method may be implemented in other manners. For example, the foregoing described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present invention. The storage medium includes various media that may store processing code, such as a USB flash drive, a removable hard disk, a ROM, a RAM, a magnetic disk, and an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

What is claimed is:

1. A resource-push method, comprising:
   obtaining, by a resource-push server, a target relationship chain of a benchmark user;
   determining at least one relational user of the benchmark user according to the benchmark user and the target relationship chain;
   obtaining parameter characteristics of the at least one relational user from a preset database, the parameter characteristics comprising a user portrait feature and an embedding vector mapped by a network node in a homogeneous network in which the benchmark user or the at least one relational user is located;
   determining a similarity value between each of the at least one relational user and the benchmark user according to the parameter characteristics, or a probability value of each of the at least one relational user according to the parameter characteristics; and
   determining at least one push user from the at least one relational user according to the similarity value or the probability value, so as to push a target resource to the at least one push user,
   wherein determining the similarity value between each of the at least one relational user and the benchmark user according to the parameter characteristics comprises:
      combining the parameter characteristics of each of the at least one relational user to obtain a first preset-dimension target vector of each of the at least one relational user, and combining the parameter characteristics of the benchmark user to obtain a second preset-dimension target vector of the benchmark user, and
      calculating similarity between the second preset-dimension target vector of the benchmark user and the first preset-dimension target vector of each of the at least one relational user according to a preset function, to obtain the similarity value between each of the at least one relational user and the benchmark user.

2. The method according to claim 1, wherein, after determining at least one push user in the at least one relational user according to the similarity value or the probability value, the method further comprises:
   selecting, from the at least one push user, a benchmark user who is used to push the target resource for next time.

3. The method according to claim 2, wherein the selecting, from the at least one push user, a benchmark user who is to push the target resource for next time comprises:
   setting a positive feedback user from the at least one push user as the benchmark user who is used to push the target resource for the next time.

4. The method according to claim 1, wherein the determining a probability value of each of the at least one relational user according to the parameter characteristics comprises:
   inputting the parameter characteristics to a logistic regression (LR)/support vector machine (SVM) model, and predicting the probability value of each of the at least one relational user using the LR/SVM model,
   wherein the LR/SVM model is trained according to a gradient boosting decision tree (GBDT) leaf node sequence and the embedding vector, and the GBDT leaf node sequence is obtained by inputting a preset sample training set to the GBDT model for conversion.

5. The method according to claim 1, wherein the preset function comprises any one of a Pearson correlation coefficient, cosine similarity, Jaccard similarity, and a Euclidean distance.

6. The method according to claim 1, wherein the parameter characteristics further comprise an interest tag used for reflecting a favored resource type of a benchmark user or a relational user.

7. The method according to claim 1, wherein, before the determining a similarity value between each of the at least one relational user and the benchmark user according to the parameter characteristics, or a probability value of each of the at least one relational user according to the parameter characteristics, the method further comprises:
   filtering the parameter characteristics according to a similarity calculation condition, to obtain filtered parameter characteristics; and
   determining the similarity value between each relational user and the corresponding benchmark user according to the filtered parameter characteristics, or the probability value of each of the at least one relational user according to the filtered parameter characteristics.

8. A resource-push apparatus, comprising:
   a memory storing computer program instructions; and
   a processor coupled to the memory and, when executing the computer program instructions, configured to perform:
   obtaining a target relationship chain of a benchmark user;
   determining at least one relational user of the benchmark user according to the benchmark user and the target relationship chain;
   obtaining parameter characteristics of the at least one relational user from a preset database, the parameter characteristics comprising a user portrait feature and an embedding vector mapped by a network node in a homogeneous network in which the benchmark user or the at least one relational user is located;

determining a similarity value between each of the at least one relational user and the benchmark user according to the parameter characteristics, or a probability value of each of the at least one relational user according to the parameter characteristics; and determining at least one push user from the at least one relational user according to the similarity value or the probability value, so as to push a target resource to the at least one push user, wherein determining the similarity value between each of the at least one relational user and the benchmark user according to the parameter characteristics comprises:

combining the parameter characteristics of each of the at least one relational user to obtain a first preset-dimension target vector of each of the at least one relational user, and combining the parameter characteristics of the benchmark user to obtain a second preset-dimension target vector of the benchmark user, and calculating similarity between the second preset-dimension target vector of the benchmark user and the first preset-dimension target vector of each of the at least one relational user according to a preset function, to obtain the similarity value between each of the at least one relational user and the benchmark user.

9. The apparatus according to claim 8, wherein, after determining at least one push user in the at least one relational user according to the similarity value or the probability value, the processor is further configured to perform:

selecting, from the at least one push user, a benchmark user who is used to push the target resource for next time.

10. The apparatus according to claim 9, wherein the selecting, from the at least one push user, a benchmark user who is to push the target resource for next time comprises:

setting a positive feedback user from the at least one push user as the benchmark user who is used to push the target resource for the next time.

11. The apparatus according to claim 8, wherein the determining a probability value of each of the at least one relational user according to the parameter characteristics comprises:

inputting the parameter characteristics to a logistic regression (LR)/support vector machine (SVM) model, and
predicting the probability value of each of the at least one relational user using the LR/SVM model,
wherein the LR/SVM model is trained according to a gradient boosting decision tree (GBDT) leaf node sequence and the embedding vector, and the GBDT leaf node sequence is obtained by inputting a preset sample training set to the GBDT model for conversion.

12. A non-transitory computer-readable storage medium storing computer program instructions executable by at least one processor to perform:

obtaining a target relationship chain of a benchmark user;
determining at least one relational user of the benchmark user according to the benchmark user and the target relationship chain;
obtaining parameter characteristics of the at least one relational user from a preset database, the parameter characteristics comprising a user portrait feature and an embedding vector mapped by a network node in a homogeneous network in which the benchmark user or the at least one relational user is located;

determining a similarity value between each of the at least one relational user and the benchmark user according to the parameter characteristics, or a probability value of each of the at least one relational user according to the parameter characteristics; and determining at least one push user from the at least one relational user according to the similarity value or the probability value, so as to push a target resource to the at least one push user, wherein determining the similarity value between each of the at least one relational user and the benchmark user according to the parameter characteristics comprises:

combining the parameter characteristics of each of the at least one relational user to obtain a first preset-dimension target vector of each of the at least one relational user, and combining the parameter characteristics of the benchmark user to obtain a second preset-dimension target vector of the benchmark user; and calculating similarity between the second preset-dimension target vector of the benchmark user and the first preset-dimension target vector of each of the at least one relational user according to a preset function, to obtain the similarity value between each of the at least one relational user and the benchmark user.

13. The non-transitory computer-readable storage medium according to claim 12, wherein, after determining at least one push user in the at least one relational user according to the similarity value or the probability value, the computer program instructions are executable by at least one processor to further perform:

selecting, from the at least one push user, a benchmark user who is used to push the target resource for next time.

14. The non-transitory computer-readable storage medium according to claim 13, wherein the selecting, from the at least one push user, a benchmark user who is to push the target resource for next time comprises:

setting a positive feedback user from the at least one push user as the benchmark user who is used to push the target resource for the next time.

15. The apparatus according to claim 8, wherein the preset function comprises any one of a Pearson correlation coefficient, cosine similarity, Jaccard similarity, and a Euclidean distance.

16. The apparatus according to claim 8, wherein the parameter characteristics further comprise an interest tag used for reflecting a favored resource type of a benchmark user or a relational user.

17. The apparatus according to claim 8, wherein, before the determining a similarity value between each of the at least one relational user and the benchmark user according to the parameter characteristics, or a probability value of each of the at least one relational user according to the parameter characteristics, the method further comprises:

filtering the parameter characteristics according to a similarity calculation condition, to obtain filtered parameter characteristics; and determining the similarity value between each relational user and the corresponding benchmark user according to the filtered parameter characteristics, or the probability value of each of the at least one relational user according to the filtered parameter characteristics.

18. The non-transitory computer-readable storage medium according to claim 12, wherein the determining a probability value of each of the at least one relational user according to the parameter characteristics comprises:
   inputting the parameter characteristics to a logistic regression (LR)/support vector machine (SVM) model, and
   predicting the probability value of each of the at least one relational user using the LR/SVM model,
   wherein the LR/SVM model is trained according to a gradient boosting decision tree (GBDT) leaf node sequence and the embedding vector, and the GBDT leaf node sequence is obtained by inputting a preset sample training set to the GBDT model for conversion.

19. The non-transitory computer-readable storage medium according to claim 12, wherein the preset function comprises any one of a Pearson correlation coefficient, cosine similarity, Jaccard similarity, and a Euclidean distance.

20. The non-transitory computer-readable storage medium according to claim 12, wherein the parameter characteristics further comprise an interest tag used for reflecting a favored resource type of a benchmark user or a relational user.

\* \* \* \* \*